W. V. GILBERT.
COMPOUND LEVER.
APPLICATION FILED NOV. 26, 1910.
1,047,785.
Patented Dec. 17, 1912.
5 SHEETS—SHEET 1.
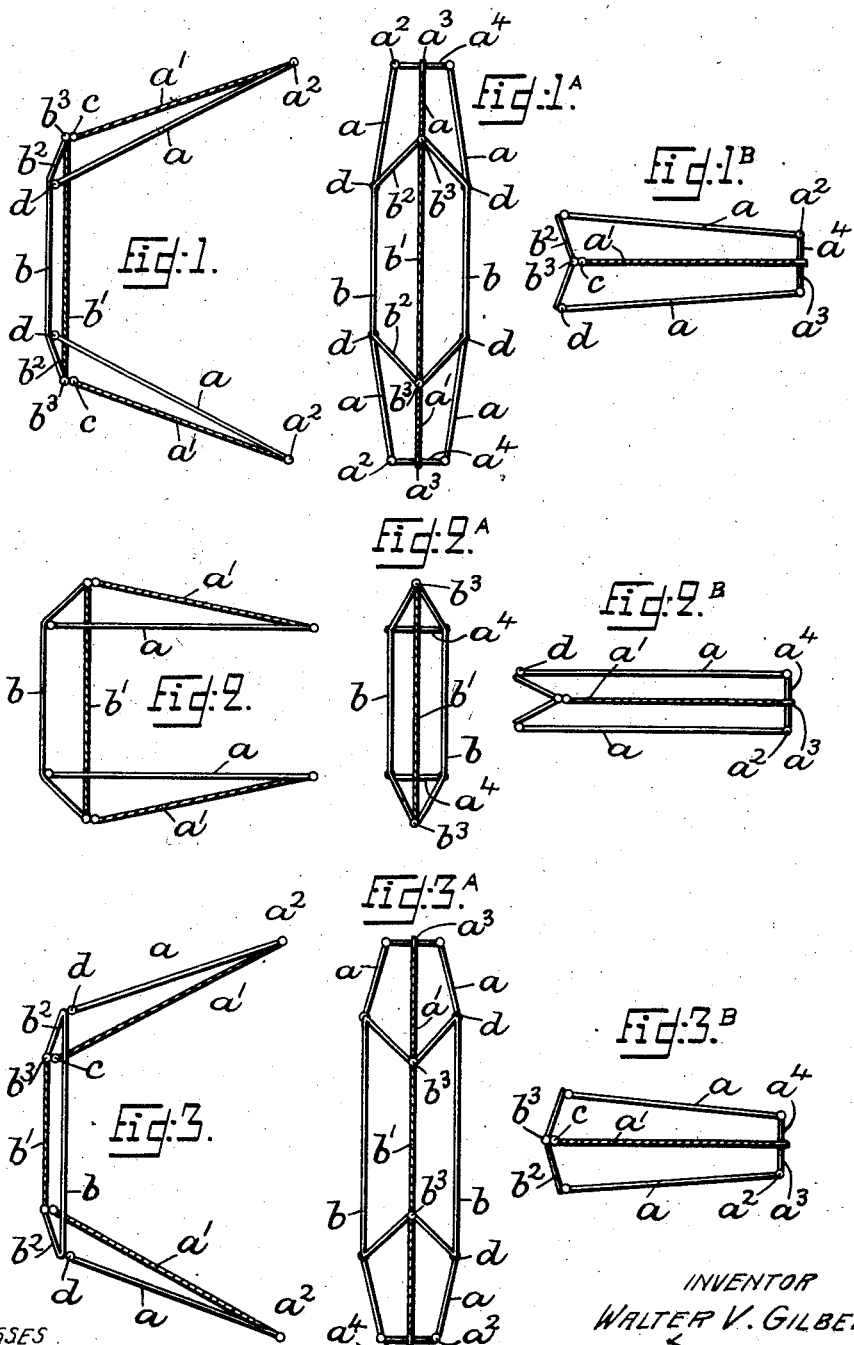
WITNESSES
INVENTOR
WALTER V. GILBERT,
BY
ATTORNEYS W. V. GILBERT.
COMPOUND LEVER.
APPLICATION FILED NOV. 26, 1910.
1,047,785.
Patented Dec. 17, 1912.
5 SHEETS—SHEET 2.
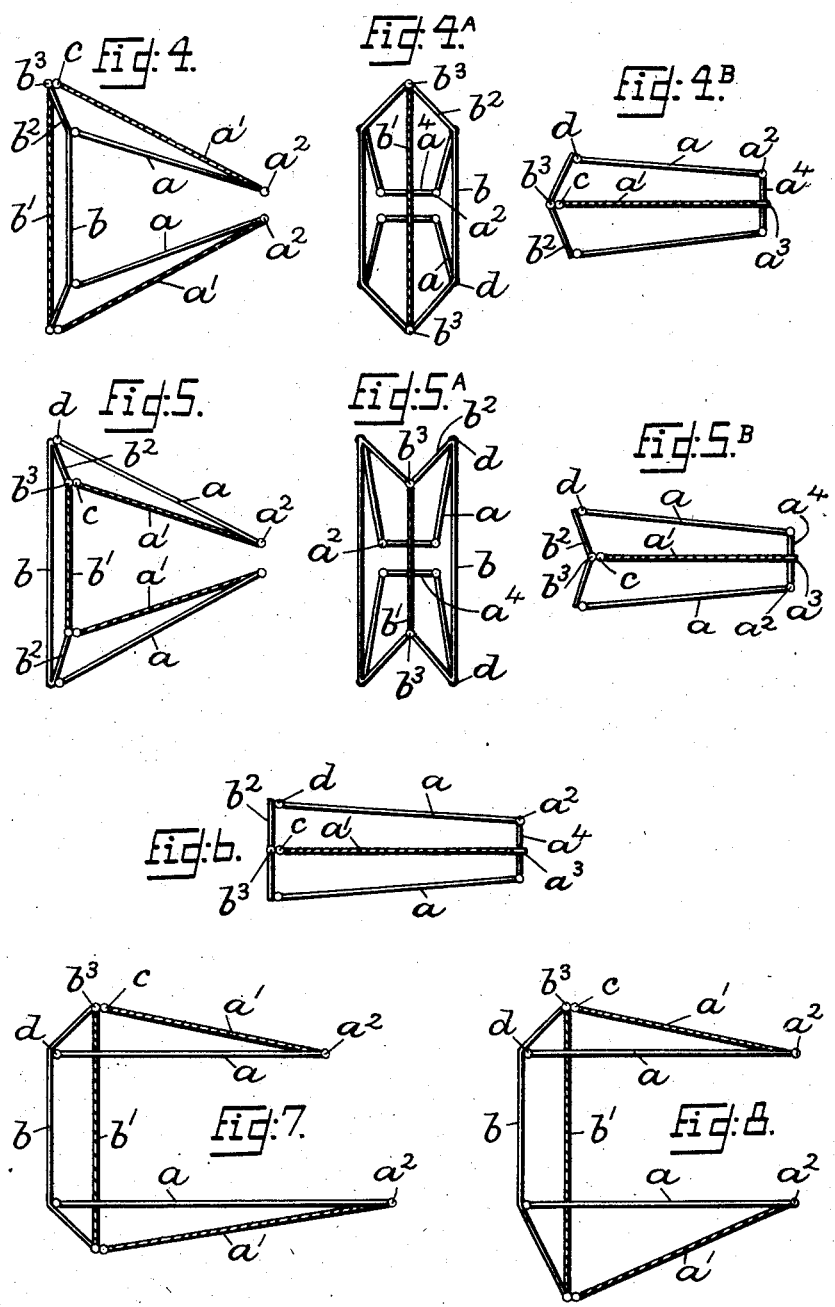

W. V. GILBERT.
COMPOUND LEVER.
APPLICATION FILED NOV. 26, 1910.
1,047,785.
Patented Dec. 17, 1912.
5 SHEETS—SHEET 3.
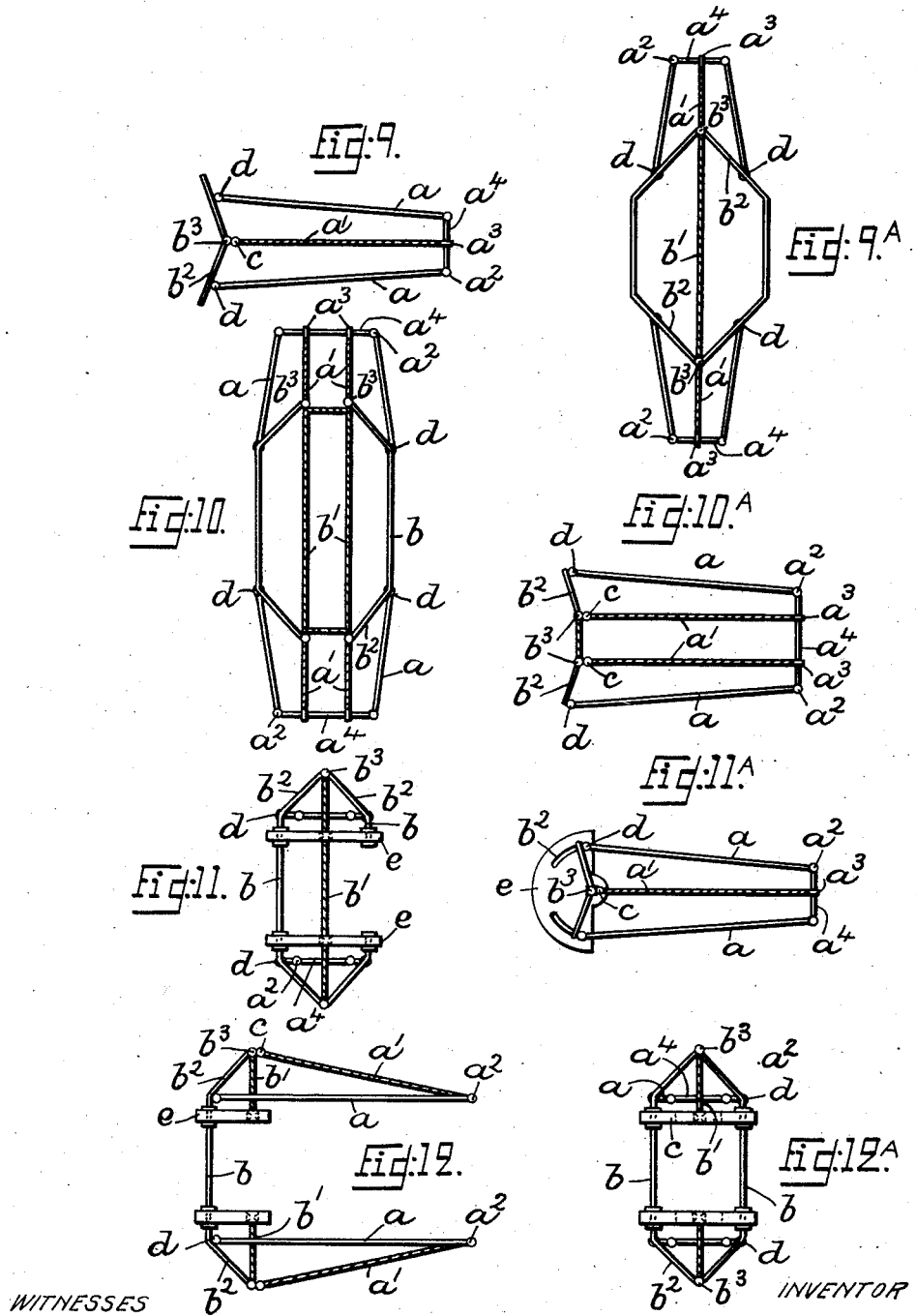

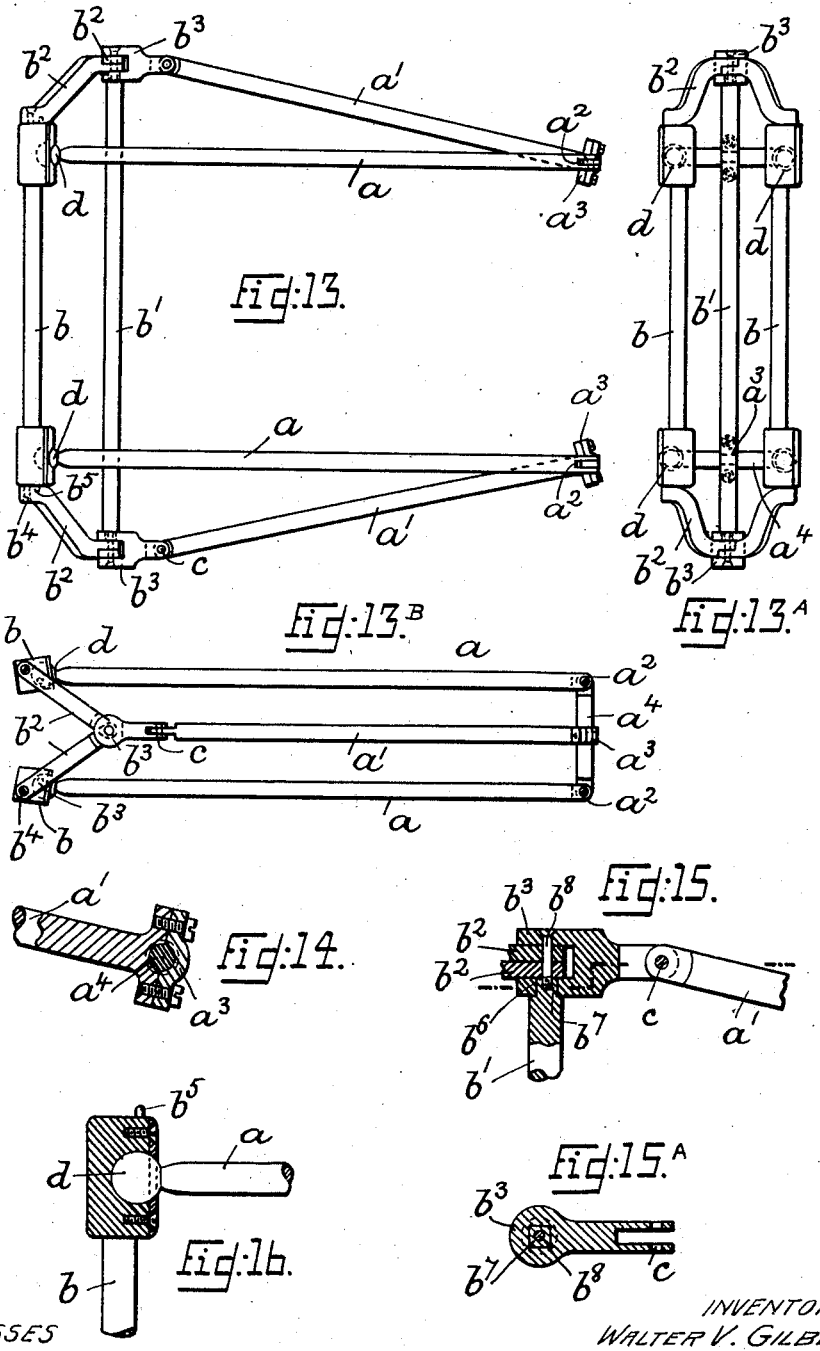

W. V. GILBERT.
COMPOUND LEVER.
APPLICATION FILED NOV. 26, 1910.
1,047,785.
Patented Dec. 17, 1912.
5 SHEETS—SHEET 5.
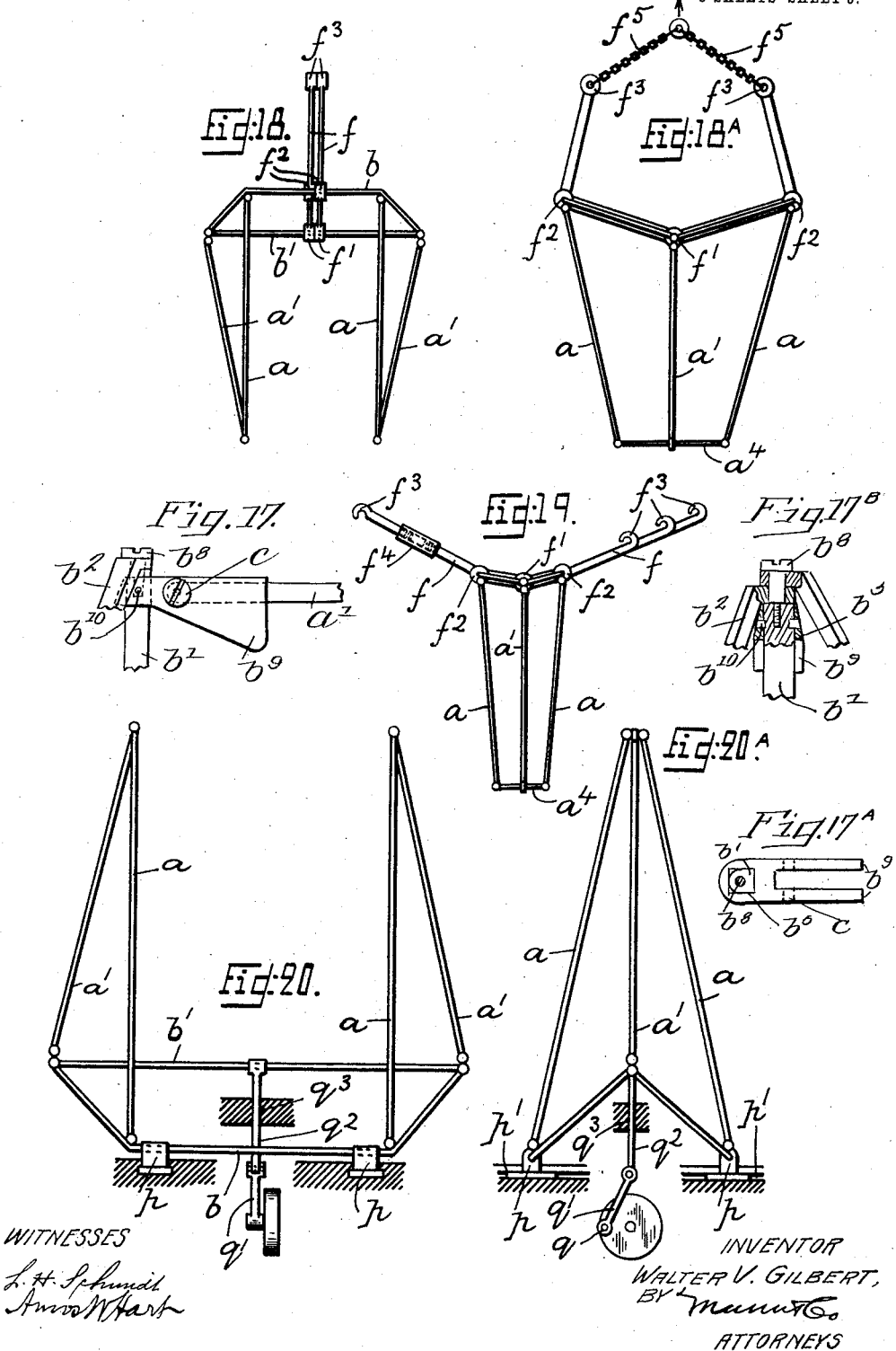
WITNESSES
INVENTOR
WALTER V. GILBERT,
BY
ATTORNEYS

UNITED STATES PATENT OFFICE.

WALTER VILLA GILBERT, OF LONDON, ENGLAND.

COMPOUND LEVER.

1,047,785.  Specification of Letters Patent.  Patented Dec. 17, 1912.

Application filed November 26, 1910. Serial No. 594,408.

*To all whom it may concern:*

Be it known that I, WALTER VILLA GILBERT, a subject of the King of Great Britain and Ireland, and a resident of London, England, have invented certain new and useful Improvements in Compound Levers; and I do hereby declare the following to be a full, clear, and exact description of the same.

This invention relates to compound levers of the type having opposing arms or parts whose forward ends are free and a back part connecting the arms at their rearward ends, such a device being so adapted that when actuated it is caused to operate in a plane at an angle to the line of actuation. Devices of such type, formed entirely of resilient material, are described in the specifications of Patents Nos. 833042 dated 9 October 1906, 846561 dated 12 March 1907, and 966325 dated 2 August 1910, granted to me, and application for patent Serial No. 517896 dated 15 September 1909, filed by me. Such a device has the back part made of an indented or slotted formation between its ends, and is actuated by compression of the back part so as to cause the arms to operate, and when the back part is released from such actuation the device resiles to its normal condition.

The present invention has for its objects, *inter alia*, to construct a compound lever of the type aforesaid but which is inert or practically so, and to construct a device which may be actuated by the back or by the arms and in which by appropriately actuating the back or the arms, the approach or separation at will, of the arms or back ends may be effected.

The invention enables the actuation of the device to utilize compressive or distensive forces, and enables the industrial application of compound levers of the type aforesaid to be materially extended.

The invention consists in a compound lever of the type aforesaid, but wherein the arms and the back part are made of members of a rigid nature, or practically rigid nature, that is to say resiliency of the members is not a property upon which operation of the device is dependent. The arms each consist of side and intermediary members connected together, and the back consists of end and intermediary members connected together. The arm and back intermediary members are in connection, and the side members of the arms are connected to the back-end-members on the sides of the back intermediary member or of the plurality of back intermediary members. The back intermediary member or members forms or form what is herein termed a primary or basic fulcrum or fulcrum area. The various connections of the component members of the arms and back are effected by suitable universal joints, or other suitable articulative means. These connections may be made so that they may be easily separated or disconnected whereby the device may be readily taken to pieces for facility of transport or storage and reassembled when desired. The various members comprising the device may be in the form of bars, rods, tubes, or the like rigid members.

The device may be made in a considerable variety of forms and the back may be of such a shape that the primary fulcrum is arranged forward or rearward of the end members of the back. The shape of the back and the arrangement of the points of connection of the arm members to the back determine whether the arms approach or separate when the back is under a given actuation, and whether the back-ends approach or separate when the arms are under a given actuation. The back and the arms may be made with one or more intermediary members, and the respective intermediary member or members may be longer or shorter than the other members of the back or of the arms. Guides, checks, or the like may be added to partly control the actuation or operation of the device by retaining or aiding in retaining the intermediary members in one plane, or otherwise.

In combination with the back of the device may be used what are herein termed primary or auxiliary actuating levers which are connected to the back-end-members by appropriately jointed or movable connections or otherwise, and if necessary to the intermediary member of the back.

The primary actuating levers may be built each of a single piece, but in some cases it is desirable that they should be made in sections so as to be capable of extension or collapsion in length. These levers may project beyond the back-ends, and may be provided at different distances along their length with hooks, holes, or other suitable attachments for the purpose of providing various positions to which force may be applied. By these means force applied to the device can to a given extent be rendered capable of adjustment. The various points of connection of the primary actuating levers enable the lifting chains, for instance, of a crane to apply variable actuation to said levers.

Various modifications of the invention are illustrated, by way of example, in the accompanying drawings, in which, except where otherwise stated, the views are diagrammatic only.

Figures 1, 1$^A$, 1$^B$ are respectively a side elevation, a rear elevation, and a plan of one modification, showing the parts in one position; Figs. 2, 2$^A$, 2$^B$ are similar views, showing the parts in another position; Figs. 3, 3$^A$, 3$^B$ are respectively a side elevation, a rear elevation, and a plan of another modification; Figs. 4, 4$^A$, 4$^B$ are similar views of another modification; Figs. 5, 5$^A$, 5$^B$ are similar views of another modification; Fig. 6 is a plan of another modification; Fig. 7 is a side elevation of another modification; Fig. 8 is a side elevation of another modification; Figs. 9, 9$^A$ are respectively a plan and a rear elevation of another modification; Figs. 10, 10$^A$ are respectively a rear elevation and a plan of another modification; Figs. 11, 11$^A$ are respectively a rear elevation and a plan of another modification; Figs. 12, 12$^A$ are respectively a side elevation and a rear elevation of another modification; Figs. 13, 13$^A$, 13$^B$ are respectively views corresponding to Figs. 2, 2$^A$, 2$^B$, of a constructional embodiment of the invention on an enlarged scale; Figs. 14, 15, 15$^A$, 16 are constructional detail views of joints shown in such embodiment on an enlarged scale; Figs. 17, 17$^A$, 17$^B$ are modified constructional detail views of joints and guides or the like; Figs. 18, 18$^A$ are respectively a side elevation and a view at right angles thereto, illustrating the use in combination with the device of auxiliary actuating levers, and also the application of the invention as a grab; Fig. 19 is a view corresponding to Fig. 18$^A$, illustrating modifications of auxiliary actuating levers; Figs. 20, 20$^A$ are vertical views at right angles to one another of an embodiment of the invention as a machine element with a crank drive.

Like reference letters indicate like or equivalent parts wherever repeated on the drawings.

$a$, represents the arm side and $a^1$ the arm intermediary members, connected together by joints, $a^2$, $a^3$, and end-pieces, $a^4$.

$b$ represents end-parts, and $b^2$ side-parts of the back-end-members.

$b^1$ represents the back intermediary member or members. The back end and intermediary members are connected together by joints, $b^3$. The intermediary member or members, $b^1$, constitutes or constitute what has been called the primary fulcrum.

The arms are arranged in opposite relation and the arm intermediary member or members of each arm is or are connected to the back intermediary member or members by joints, $c$. The arm side members are connected to the back-end-members by joints, $d$, on opposite sides of the back intermediary member or of the plurality of back intermediary members. The device thus constitutes opposing arms and a back part connecting them together.

In the drawings the various members, $a$, $a^1$, $b$, $b^2$, $b^1$, are represented as rigid rods or bars.

In order to facilitate interpretation of the drawings, in some figures the arm-intermediary-members are shown hatched in one direction, and the back-intermediary-members are shown hatched in another direction.

In Figs. 1 to 2$^B$, the back-intermediary-member, $b^1$, is longer than the back-ends, $b$, that is to say the distance between the joints, $b^3$, is greater than that between the joints, $d$, on the respective right or left side of the fulcrum, $b^1$. Further, the device is so arranged that the fulcrum, $b^1$, is situate forward of the back-ends, $b$. In this construction, actuation causing approach or separation of the back-ends, $b$, causes respectively approach, Figs. 2 to 2$^B$, or separation Figs. 1 to 1$^B$, of the arms.

In Figs. 3 to 3$^B$, similar results to those just described are obtained from similar actuations, but the construction is modified. The back-intermediary-member, $b^1$, is shorter than the back-ends, $b$, that is to say the distance between the joints, $b^3$, is less than that between the joints, $d$, on the respective right or left side of the fulcrum, $b^1$. Further, the device is so arranged that the fulcrum, $b^1$, is situate rearward of the back-ends, $b$.

In Figs. 4 to 4$^B$, opposite results to those just described are obtained from similar actuations, and the construction is modified. The back-intermediary-member $b^1$, is longer than the back-ends, $b$, and is situate rearward of the back-ends, $b$. In this construction, actuation causing approach or separation of the back-ends causes respectively separation or approach of the arms.

In Figs. 5 to 5$^B$, similar results to those just described are obtained from similar actuations, but the construction is modified. The back-intermediary-member, $b^1$, is shorter than the back-ends, $b$, and is situate forward of the back-ends, $b$.

In Fig. 6, the construction is modified in that the back-intermediary-member, $b^1$, is situate in the same plane as that in which the back-ends, $b$, lie. In this construction:—
When the back-intermediary-member, $b^1$, is longer than the back-ends, $b$; actuation causing approach or separation of the back-ends, $b$, rearward of the back-intermediary-member, $b^1$, causes respectively approach or separation of the arms; and actuation causing approach or separation of the back-ends, $b$, forward of the back-intermediary-member, $b^1$, causes respectively separation or approach of the arms. When the back-intermediary-member, $b^1$, is shorter than the back-ends, $b$, opposite results to those just described are obtained from similar actuations.

The construction shown in Fig. 6 is thus adapted to operate so as to cause the arms either to approach or recede from one another when the back is actuated by a force which is only adapted to cause the back-ends to approach one another.

Other constructional modifications of the device may be made to obtain special effects or for other purposes, for instance:—In Fig. 7, the arms are of different lengths. In Fig. 8, the joints, $b^3$, are placed differently distant from the respective adjacent joints, $d$, so that differential movements of the arms are obtained. In Figs. 9 and 9$^A$, the arm side members, $a$ are connected to the side-parts, $b^2$, of the back-end-members on opposite sides of the back-intermediary-member, $b^3$, by the joints, $d$, which are arranged at some point along the side parts, $b^2$, in the example shown, approximately at the midlength point of the side parts, $b^2$. In Figs. 10, and 10$^A$, each arm and the back are respectively provided with a plurality of intermediary-members, or a broadened intermediary-member, $a^1$, $b^1$, Other constructional modifications of the device may be made to accommodate special applications of the invention or for other purposes, for instance:—In Figs. 11, 11$^A$, part of one back-end, $b$, is dispensed with; and in Figs. 12, 12$^A$, part of the back-intermediary-member, $b^1$, is dispensed with. In these figures slotted guides, $e$, or equivalent means are mounted on or secured to the back-intermediary-member, $b^1$, for the back-ends to work in or to be controlled by. Similar guides or equivalent means may be used in the other constructions.

It will be seen from the foregoing that in all forms of construction, in the actuation of the device the back-intermediary-member, $b^1$, approaches or recedes from a plane in which the back-ends, $b$, lie.

Referring to the constructional embodiment of the invention represented, by way of example, in Figs. 13 to 16, which corresponds to that shown in Figs. 1 to 2$^B$, the arm side and intermediary members, $a$, $a^1$, of each arm are connected together at their forward ends by joints $a^2$, $a^3$; and end pieces, $a^4$. These joints are of such a nature as to permit the arm side members of each arm to have facility of oscillating toward or away from each other laterally, and to permit the intermediary-member of each arm to have facility of oscillating perpendicularly in relation to the side members. The rearward ends of the arm-side-members are connected to the back by ball-and-socket joints, $d$, to accommodate the arm-side-members moving laterally and upwardly and downwardly about such joints. The end-parts, $b$, and side-parts, $b^2$, of the back-end-members, are fastened together by screws, $b^4$, and pins, $b^5$. The back-end-members are connected by joints, $b^3$, so as to have facility of rotary movement about the axis of the back-intermediary-member so as to approach or recede from one another. The arm-intermediary-members are connected to the back-intermediary-member by joints, $c$, which are stationary in relation to the back-intermediary-member and only permit of movement of the arm-intermediary-members in the same plane. The movement of the arm-intermediary-members may be equivalently controlled by guides or the like secured in relation to the back-intermediary-member, or otherwise. Examples of guides of this nature are shown in Figs. 17 to 17$^B$, of the accompanying drawings, and are hereinafter described in relation thereto. The joints, $b^3$, may be of a removable nature, as shown, and be secured by having a square or equivalently formed socket, $b^6$, engaging a square or equivalently formed spigot, $b^7$, on the back-intermediary-member. A bolt or screw, $b^8$, may serve as the hinge pin for the members, $b^2$, to work on, and for securing the joint, $b^3$, in position. The other joints also may be made of a removable or dismountable nature as shown. By guiding or controlling the movement of the intermediary members so that they work in the same plane or parallelly, the arm-side-members and back-ends may be caused to work consistently. Thus, whether the device is actuated by the back, or by the arms, and whether the force is applied at any point or points, the whole device may be caused to operate with coördinate action so as to produce motion in one or another direction.

In the construction shown in Figs. 17 to 17$^B$, the back-intermediary-member, $b^1$, is made of square section. Auxiliary guides or plates, $b^9$, extend from the joints, $b^3$, and retain or aid in retaining the arm-intermediary-members in one plane. The joints, $b^3$, are formed with square holes, $b^6$, engaging the square intermediary member, $b^1$, and are secured in position by studs, $b^{10}$.

In Figs. 18, 18$^A$, $f$ represents auxiliary actuating levers pivotally mounted on the back-intermediary-member, $b^1$, at $f^1$, and on the back-ends, $b$, at $f^2$, and provided at their free ends with hooks, eyes, or other attachments, $f^3$, to facilitate connection to actuating means, for instance, the operating chains, $f^5$, of a crane or the like, when the device is used as a grab.

Fig. 19 illustrates how the auxiliary actuating levers may be made adjustable in length, as at $f^4$, or provided with varying points of attachment, $f^3$, to enable the actuation of the device to be varied to a certain extent.

Figs. 20, 20$^A$, illustrate an application of the invention as a machine element actuated by a crank drive. The crank, $q$, is connected by a link, $q^1$, to a slide rod, $q^2$, working in a guide, $q^3$, and connected to the back-intermediary-member. The back-ends are pivotally mounted on slide blocks, $p$, working in guides, $p^1$. In this example, when the crank is turned the back-intermediary-member is reciprocated vertically, the back-ends alternately approach and recede from one another in one plane, and the arms alternately approach and recede from one another in a plane at right angles to the first.

It will thus be seen that the device may be used for a great variety of purposes and is especially adapted to produce or resist movements in a plane at an angle to the line of force or actuation.

What I do claim as my invention and desire to secure by Letters Patent is:—

1. A compound lever of the nature aforesaid comprising opposing arms having free forward ends and each constructed of connected rigid members angularly disposed, a back part connected to the rearward ends of the arms and constructed of connected rigid members lying in angularly disposed planes, and articulative means at said connections, substantially as described.

2. A compound lever of the nature aforesaid comprising opposing arms spaced apart and having free forward ends and constructed of connected side and intermediary rigid members, a back part connected to the rearward ends of the arms and constructed of connected end and intermediary rigid members, and articulative means at said connections, substantially as described.

3. A compound lever of the nature aforesaid comprising opposing arms having free forward ends and constructed of side and intermediary rigid members connected at their forward ends, a back part constructed of connected end and intermediary rigid members, the arm intermediary members being connected at their rearward ends to the back intermediary member, and the arm side members being connected at their rearward ends to the back end members on opposite sides of the back intermediary member, and articulative means at said connections, substantially as described.

4. A compound lever of the nature aforesaid comprising opposing arms having free forward ends and constructed of side and intermediary rigid members connected at their forward ends, a back part connected to the rearward ends of the arms and constructed of connected end and intermediary members, and articulative means at said connections, the distance between the points of connection of the arm side members to the back end members on either side of the back intermediary member being different from the distance between the points of connection of the arm intermediary members to the back intermediary member, substantially as described.

5. A compound lever of the nature aforesaid comprising opposing arms having free forward ends and constructed of side and intermediary members connected at their forward ends, a back part connected to the rearward ends of the arms and constructed of connected end and intermediary rigid members, the back end members being composed of end parts and side parts connected to the back intermediary member, and articulative means at said connection, substantially as described.

6. A compound lever of the nature aforesaid comprising opposing arms having free forward ends and constructed of side and intermediary rigid members connected at their forward ends, a back part constructed of connected rigid members, articulative means at said connections, articulative means connecting the rearward ends of the arm intermediary members to the back, and articulative means connecting the rearward ends of the arm side members to the back in such manner as to allow the arm side members to approach or separate from one another while at the same time the arms may vary their relative positions, substantially as described.

7. A compound lever of the nature aforesaid comprising opposing arms having free forward ends and constructed of side and intermediary rigid members connected at their forward ends, a back part having connected end rigid members, articulative means at said connections, articulative means connecting the rearward ends of the arm intermediary members to the back, and ball-and-socket joints connecting the rearward ends of the arm side members to the back end members, substantially as described.

8. A compound lever of the nature aforesaid comprising opposing arms having free forward ends and constructed of side and intermediary rigid members connected at their forward ends, a back part connected to the rearward ends of the arms and constructed of connected rigid members, articulative means at such connections, and means for controlling or guiding the intermediary members in such manner that they operate in a predetermined plane when the device is under actuation, substantially as described.

9. A compound lever of the nature aforesaid comprising opposing arms having free forward ends and having side rigid members connected at their forward ends, a back part constructed of connected rigid members, articulative means connecting the rearward ends of the arm members to the back, articulative means connecting the back members, and hinge-like means at the connections of the forward ends of the arm side members, substantially as described.

10. A compound lever of the nature aforesaid comprising opposing arms having free forward ends and constructed of side and intermediary rigid members connected at their forward ends, a back part constructed of connected rigid members, articulative means connecting the rearward ends of the arm members to the back, articulative means connecting the back members, and hinge-like means at the connections of the forward ends of the arm intermediary members, substantially as described.

11. A compound lever of the nature aforesaid comprising opposing arms having free forward ends and constructed of side and intermediary rigid members, transverse end pieces at the forward ends of the arm members, a back part constructed of connected rigid members, articulative means connecting the rearward ends of the arm members to the back, articulative means connecting the back members, and articulative means connecting the arm intermediary and side members to said end pieces in such manner that the arm intermediary members maintain a constant angular relation to said end pieces while the arm side members may vary their angular relation to said end pieces, substantially as described.

12. A compound lever of the nature aforesaid comprising opposing arms having free forward ends and each having a rigid member, a back part constructed of connected rigid members, pivots supported by the back and on which said arm members may turn in one plane, pivots connecting the back members and on which they may turn in a second plane at an angle to the first, and rigid members and articulative means connecting the forward ends of said arm members to the respective back members, substantially as described.

13. A compound lever of the nature aforesaid comprising opposing arms having free forward ends and constructed of side and intermediary rigid members connected at their forward ends, a back part connecting the rearward ends of the arms and constructed of connected end and intermediary members, and articulative means at said connections, the articulative means connecting the back end members to the back intermediary members permitting the back end members to turn in one plane, and the articulative means connecting the arm intermediary members to the back intermediary member permitting the arm intermediary members to turn in a second plane at an angle to the first, substantially as described.

14. A compound lever of the nature aforesaid comprising opposing arms having free forward ends and constructed of rigid members connected together, a back part connected to the rearward ends of the arms and constructed of connected end and intermediary rigid members, articulative means at such connections, and means guiding some of said members in such manner that when any of the members of the device are set in actuation the other members operate with coördinate movements, substantially as described.

In testimony whereof I affix my signature in presence of two subscribing witnesses.

WALTER VILLA GILBERT.

Witnesses:
 ALFRED DAY,
 WALTER DAY.

---

Copies of this patent may be obtained for five cents each, by addressing the "Commissioner of Patents, Washington, D. C."